United States Patent Office 3,649,714
Patented Mar. 14, 1972

3,649,714
STRUCTURAL ADHESIVE COMPRISING A DI-
CYANATE AND A COPOLYMER OF ACRYLO-
NITRILE AND BUTADIENE
David A. Wangsness, Mahtomedi, Minn., assignor to
Minnesota Mining and Manufacturing Company, St.
Paul, Minn.
No Drawing. Filed Jan. 10, 1969, Ser. No. 790,467
Int. Cl. C08d 9/08
U.S. Cl. 260—887                                    13 Claims

ABSTRACT OF THE DISCLOSURE

A mixture of dicyanate, such as the dicyanate of Bisphenol A, and compatible, uncured synthetic elastomer (e.g., acrylonitrile-butadiene copolymer) is used as a nonvolatile, film-forming, heat-curable, structural metal-bonding adhesive to produce a thermally stable bond having desirably high strengths in shear, tension, and peel.

FIELD OF THE INVENTION

This invention relates to heat curable adhesives useful in structural metal-bonding. In another aspect, it relates to the preparation and use of such adhesives. In a further aspect it relates to the use of dicyanates; such as aromatic dicyanates, which can be thermally polymerized to form cyanurate polymers.

BACKGROUND OF THE PRIOR ART

The advantages of elastomeric adhesives, such as phenolic-nitrile and phenolic-epoxy combinations, as structural metal-bonding adhesives have been appreciated since the beginning of their development after World War II. Structural metal-bonding adhesives are used in modern aircraft structures today, such as supersonic airplanes and missiles, the fabrication of which is enhanced by the use of such adhesives. However, the structural metal-bonding adhesives of the prior art have recognized limitations of bonding. Present structural adhesives vary considerably in properties and there is no truly general-purpose adhesive. Some types deteriorate as a function of time under certain conditions of service. The temperature resistance or thermal stability of the bonds of some of these adhesives is not as high as desired, particularly in the aerospace industry where temperature profiles of aircraft and missiles have been steadily increasing. Many of these adhesive bonds do not have the requisite flexibility or toughness at ambient and/or higher temperatures. Some of these adhesives give off volatile by products or solvent vapors during curing and these are undesirable in many applications, for example, in bonding impervious metal adherends. Others require impractical high elevated curing temperatures (e.g., 700–1000° F.) and some adhesives, such as rubber-based adhesives, produce bonds which cannot withstand continued stress at elevated temperatures and fail at loads much lower than initial strength.

BRIEF SUMMARY OF THE INVENTION

The adhesive of this invention comprises a stable, film-forming mixture of dicyanate, such as an aromatic dicyanate, e.g., Bisphenol A dicyanate, and a compatible, vulcanizable, synthetic elastomer, such as an acrylonitrile-butadiene elastomer. Such mixture can be prepared as an organic solvent solution and the solution cast in the form of a film and dried to remove solvent. The resulting film can be used as a one-part, storage stable, structural metal-bonding adhesive. For example, said dry film can be inserted between adherends, such as the aluminum alloy skins of airframe assemblies, and the resulting assembly heated to cure the adhesive. The dicyanate component thermally polymerizes to form a cyanurate polymer, and the vulcanizable synthetic elastomer, in the presence of vulcanizing agents, cures to form a tough flexible polymer (i.e., both the dicyanate and elastomer cure in situ when the bonded assembly is heated, at least at the locus of the bond). During curing of these materials, no significant amount, if any, of volatile by-products are produced nor is any solvent volatilized. The resulting bonding is thermally stable at high temperatures and has desirably high strengths in stress, tension and peel. Another advantage of the adhesive composition of this invention is its stability; it can be stored at room temperature and doesn't have to be refrigerated to prevent or minimize premature reaction or curing.

DETAILED DESCRIPTION OF THE INVENTION

The dicyanate component of the novel adhesive of this invention preferably has the formula:

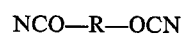

where R is a divalent aromatic moiety, such as phenylene, and the like, or a plurality of such moieties, e.g., 2–5, each of which can be separated by bridging members, e.g., —O—, —C(O)—, —S—, —SO$_2$—, and divalent hydrocarbon bridging moieties, such as lower alkylene, e.g., methylene and dimethylmethylene. R is preferably a divalent radical having one or more, e.g., as many as 15 or more, aromatic nuclei which can be linearly linked together or bridged with ethereal oxygen atoms, such as those nuclei selected from th group consisting of phenylene, diphenylene, and radicals of diphenylether, 2,2-diphenylpropane, benzophenone, and diphenylsulfone. These aromatic nuclei have structures shown as follows:

TABLE I

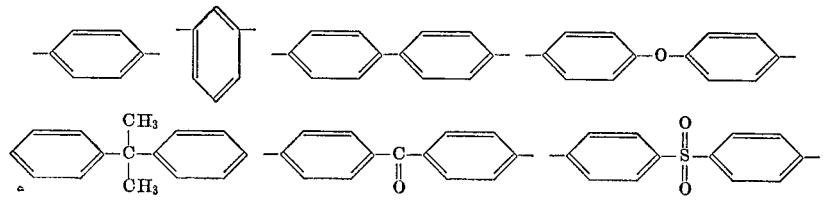

Representative cyanatophenyl - terminated polyarylene ethers coming within the scope of general Formula I, and preferred members of same, include those shown in Table II.

TABLE II

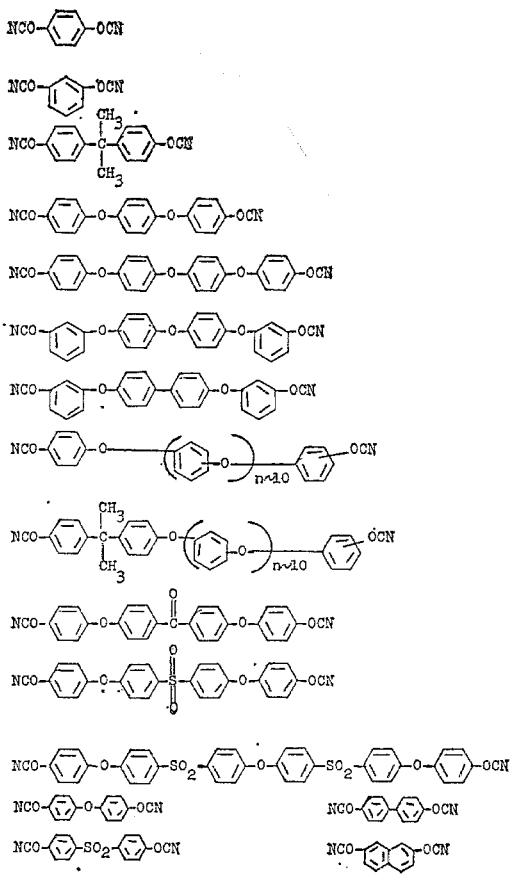

The dicyanates used in this invention can be prepared by reacting the dihydroxy polyarylene precursors with cyanogen halide in the presence of a base, such as triethylamine. U.S. Pat. No. 3,219,670 is representative of art which discloses such hydroxy precursors. Cyanation of these hydroxy precursors is generally carried out by reacting the hydroxy precursors with a stoichiometric amount of cyanogen halide. Because of the exothermic nature of the reaction and the desire to prevent side reactions, and because of the volatility of the cyanogen halide, low temperatures below the boiling points of the reactants are maintained during cyanation. Generally, low temperatures in the range of −40 to 40° C., preferably −20 to 0° C. will be used and the reaction carried out in an inert liquid organic solvent. Solvents useful for this purpose representatively include acetone, ether, tetrahydrofuran, aromatic hydrocarbons such as benzene, toluene, and xylene, and halogenated aliphatic or aromatic hydrocarbons. The cyanation reaction is carried out in the presence of a base such as tertiary amines like triethylamine or an alkali metal hydroxide such as sodium hydroxide, the amount of base used being sufficient to neutralize the hydrogen halide produced in the reaction (see German Pat. 1,190,-184). It is preferred to adjust the addition rate of the base during the cyanation process such that always an excess of cyanogen halide over the base is present.

Cyanogen halides which can be used include cyanogen chloride and cyanogen bromide, these cyanating agents being well known compounds which are commercially available or which can be prepared by well known methods. Stoichiometrically, one mole of cyanogen halide is reacted with one equivalent of a hydroxyl group in the hydroxy polyarylene reactant, however, an amount in excess of stoichiometric is preferred, e.g., cyanogen halide up to 10% excess.

After cyanation is completed, the cyanate product can be recovered from the reaction mixture by any suitable recovery procedure, such as precipitation, extraction, distillation, crystallization, etc. Preferably, the product is recovered by mixing the reaction mixture with a water-immiscible liquid organic solvent in which the cyanate is soluble, such as methylene chloride, chloroform or benzene. The resulting solvent mixture is then poured into ice water. The non-aqueous phase containing the cyanate is separated from the aqueous phase containing the neutralized halide, for example, by decanting, and can be dried, for example, over anhydrous magnesium sulfate, and filtered. The solvent can then be removed from cyanate by stripping, for example, under vacuum at room temperature.

Other aromatic dicyanates which can be used are those disclosed in German Pat. Nos. 1,190,184 and 1,195,764, Angew. Chemie, 76 303 (1964) and Acta. Chem. Scand., 18 826 (1964).

The thermal polymerization of the dicyanate component of the adhesive of this invention involves trimerization of terminal cyanato groups to form a cyanurate that has a three-dimensional network structure comprising a plurality of cyanurate rings and R bridges, the polymerization being illustrated as follows:

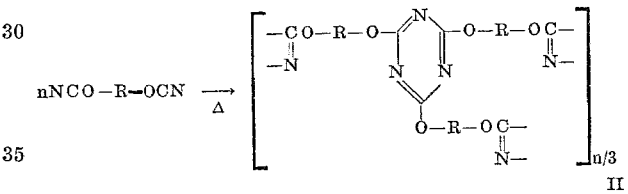

where $n$ is a multiple of 3 and can be as large as the number of molecules of dicyanate employed, and R is as defined in Formula I above.

Although the thermal polymerization of the aromatic dicyanate component can be effected solely by the use of heat, it is within the scope of this invention to incorporate in the adhesive formulation activators, initiators, or catalysts to promote the polymerization at lower temperatures. These polymerization promoting agents representatively include Lewis acids, such as aluminum chloride, boron trifluoride, ferric chloride, titanium chloride, and zinc chloride; protonic acids, such as hydrochloric and other mineral acids; salts of weak acids, such as sodium acetate, sodium cyanide, sodium cyanate, potassium thiocyanate, sodium bicarbonate, sodium boronate, and phenylmercuric acetate; and bases, such as sodium methoxide, sodium hydroxide, pyridine, triethylamine, and the like. Preferred catalysts are non-ionic coordination compounds, such as cobalt, iron, zinc, and copper acetyl acetonates. The amount of catalyst used can vary, and generally will be 0.05 to 5 mole percent, preferably 0.05 to 0.5 mole percent.

As described above, a compatible, film-forming synthetic elastomer or vulcanizate is used in combination with the dicyanate. Such elastomers are mixed in their uncured or unvulcanized state with the dicyanate, the elastomer and/or dicyanate being dissolved in a suitable solvent for this purpose which doesn't have active hydrogen atoms. The elastomers which are used must be compatible with the dicyanate, that is, the elastomer must not inhibit the trimerization of the dicyanate and must be able to form a stable, homogeneous admixture with the dicyanate (i.e., a mixture which will not separate or stratify on standing or storage). As such, the elastomer cannot be used in the form of a latex nor can it have any labile or active hydrogen atoms which readily react with —OCN. Thus, certain elastomers are not compatible because they contain active hydrogen atoms which readily react with —OCN or require the use of solvents which have active hydrogen atoms. Other elastomers will be incompatible because they will not form homogeneous mixtures with the dicyanates, but rather will stratify when mixed therewith. The elastomers which will be suitable, i.e., compatible with the dicyanate, are those which representatively include acrylonitrile-butadiene elastomeric copolymers, the preferred elastomeric material to be used herein. Commercially available acrylonitrile-butadiene copolymers which can be used herein have bound acrylonitrile contents usually ranging from about 18 to 50 percent by weight of the copolymer and Mooney viscosities (ML-4 at 100° C.) of 45–95; for best compatibility and best bonds those with bound acrylonitrile contents of 25 to 50 weight percent and Mooney viscosities of 55–95 are preferred. Acrylonitrile-butadiene copolymers which can be used include those commercially available and sold under the trademarks Hycar, e.g., Hycar 1000 x 128 (see Bulletin 64–6610–AK of the B. F. Goodrich Chemical Company) and Crynac, e.g. Krynac 806 (see Code Chart, January 1968 and Bulletin 5–67 of Polymer Corp. Ltd.).

In order to facilitate intimate admixture of the uncured synthetic elastomer with the dicyanate, these two components can be dissolved in a solvent which is inert (i.e., one which doesn't have active hydrogen atoms or other functionality which will react with the dicyanate), such as methyl ethyl ketone, acetone, methyl isobutyl ketone, and other ketones, chlorinated hydrocarbons, such as methylene chloride and trichloroethylene, aromatics, such as benzene, toluene, and xylene, etc.

The amount of synthetic elastomer used should be from about 15 to 50 weight percent, preferably 35 to 45 weight percent, based on the weight of the dicyanate. If the amount of elastomer used is 20 percent, the resulting mixture will not have the film-forming characteristics desired for some applications. If the amount of elastomer is greater than 50 percent, the resulting adhesive does not have as high a desired bonding strength where it is used in high temperature applications.

Present in the adhesive mixture is the usual or conventional curing system for curing the elastomer. Typical of such systems will be combinations of sulfur and zinc oxide, each of which can be used in the amount of 1 to 10 parts by weight per 100 parts by weight of elastomer (phr). For an elastomer such as Hycar 1000 x 128, 5 phr. zinc oxide and 3 phr. sulfur will be suitable. The elastomer can also be cured with free radical curing systems, such as 1–10 phr., preferably 3–5 phr., of dicumyl peroxide. Further details on the curing systems for the elastomers will be omitted in the interest of brevity since such details are well known in the art.

In application of the adhesive composition of this invention, it first will be desirable to prepare the surface of the adherends. For example, the surface can be mechanically cleaned with a wire brush or abrasive blasting and then chemically cleaned, for example, with caustic and/or sulfuric acid. A typical surface treatment in the case of bonding aluminum will utlize trichloroethylene vapor to remove grease and oil, followed by a rinse with water, a sulfuric acid-sodium dichromate etch, a water rinse, and then force or air dried.

The adhesive composition, as described above, is used in a solid form, for example, as a dry film. Such film can be inserted between the adherends and the assembly, held under suitable pressures, e.g., 25–150 p.s.i., the particular pressure to be used depending upon the particular assembly being bonded. The assembly is then subjected to elevated temperatures in order to cause the polymerization of the dicyanate and the vulcanization of the synthetic elastomer; for this purpose, temperatures in the range of 250° F. to 500° F., preferably 340° F. to 360° F. can be used. The curing of the adhesive will range from several minutes to several hours, depending upon the magnitude of the assembly and the bonding area. Induction heat, infrared or other heat sources can be employed to speed curing.

The adhesive composition of this invention can be used in bonding various types of joint designs, such as lap joints, angle joints, butt joints, cylindrical joints, corner joints, stiffener joints, and the like, the substrate material being bonded representatively including metals such as steel, aluminum, magnesium, titanium, copper, and alloys thereof and the like, and other rigid materials such as plastics.

EXAMPLES

The object and advantages of this invention are further illustrated by the following examples, but the particular materials and amounts thereof recited in these examples, as well as other conditions and details, should not be construed to unduly limit this invention.

EXAMPLE 1

A vulcanizable acrylonitrile-butadiene polymer (Hycar 1000 x 128, having a Mooney viscosity of 75–95 and about 35% acrylonitrile) was broken down on a rubber mill for 5 to 10 min. Sulfur and zinc oxide vulcanizing agents were blended in as powders on the rubber mill, in the following amounts:

|  | G. |
|---|---|
| Acrylonitrile-butadiene rubber | 100 |
| Sulfur | 3 |
| ZnO | 5 |
| Mill base | 108 |

The resulting vulcanizate or mill base was taken from the rubber mill in sheet form, cut into small particles, and dissolved in methyl ethyl ketone on a roller mill overnight, in the following amounts:

|  | G. |
|---|---|
| Mill base | 108 |
| Methyl ethyl ketone | 325 |
| Mill base solution | 433 |

The dicyanate of Bisphenol A (the third compound of Table I) was dissolved in methyl ethyl ketone, in the following amounts:

|  | G. |
|---|---|
| Bisphenol A dicyanate | 100 |
| Methyl ethyl ketone | 100 |
| Dicyanate solution | 200 |

The mill base solution and dicyanate solution were blended with a Lightning Mixer in the following amounts:

|  | G. |
|---|---|
| Mill base solution | 173 |
| Dicyanate solution | 200 |
| Adhesive solution [1] | 373 |

[1] Containing 40 wt. percent of the elastomer.

The adhesive solution was coated onto a silicone-treated paper release liner using knife coater set at a 15 mil orifice. The coating was dried, using the following drying schedule, to give a homogeneous, solvent-free, self-supporting film which could be stripped from the silicone liner:

30 minutes at room temperature
15 minutes at 125° F. in an air circulating oven
15 minutes at 150° F. in an air circulating oven
15 minutes at 180° F. in an air circulating oven The above-prepared adhesive film was used to bond 2024 T3 aluminum stock. This aluminum stock was first cleaned using the Forest Products Laboratory cleaning procedure (MIL-A-9067C, para 6.1.1), comprising an alkaline degrease, acid etch, rinse and drying. The bonded aluminum stock was tested to determine overlap shear strength (according to MMM-A-132), T-peel strength (according to ASTM D-1876-61-62), and honeycomb peel strength (according to MIL-A-25463). The aluminum bonded test configurations were prepared with adhesive film weighing 0.03 lbs./sq. ft. The test configurations used to determine honeycomb peel strength were made with two layers of the adhesive film to provide a sufficient amount of adhesive for filleting to occur. The test configurations were heated in an autoclave using the following cure cycle: 350° F., 25 p.s.i., 60 min., 10° F./min. rise rate. Results of this evaluation are shown below in Table III.

TABLE III

Overlap shear strength [1] (p.s.i.):
- −67° F. _____ 3782
- RT [2] _____ 3910
- 180° F. _____ 2495
- 250° F. _____ 2066
- 350° F. _____ 1771
- 500° F. _____ 1025

T-peel strength [1] (p.i.w.):
- −67° F. _____ 3
- RT _____ 50
- 180° F. _____ 12

| Honeycomb peel strength [3] load (lbs.): | Peel strength (in. lbs./in.) |
|---|---|
| 174 | 24 |
| 144 | 19 |
| 162 | 22 |
| 120 | 15 |

[1] Strength values shown are ave. of 2 runs.
[2] RT=room temp.
[3] Strength was determined at RT, using 5052 non-perforated, ¼″ cell, ½″ thick, 4 mil foil aluminum alloy honeycomb.

The data of Table III show that the adhesive of this invention not only produces bonds with high shear strength throughout the range of −67° F. to 500° F., but at the same time produces bonds with high peel strength or flexibility even at room temperature. Also, high honeycomb peel strengths are obtained.

EXAMPLE 2

In this example, another adhesive film was prepared and evaluated following the procedures of Example 1. The formulations used in preparing this adhesive film are as follows:

|  | G. |
|---|---|
| Acrylontrile-butadiene rubber | 100 |
| Sulfur | 5 |
| Methyl ethyl ketone | 325 |
| Mill base solution | 430 |

|  | G. |
|---|---|
| Bisphenol A dicyanate | 150 |
| Methyl ethyl ketone | 150 |
| Dicyanate solution | 300 |

|  | G. |
|---|---|
| Mill base solution | 123 |
| Dicyanate solution | 200 |
| Adhesive solution [1] | 323 |

[1] Containing 20 wt. percent elastomer.

The result of evaluating the test configurations are shown in Table IV.

TABLE IV

Overlap shear strength (p.s.i.):
- −67° F. _____ 2762
- RT _____ 2400
- 180° F. _____ 1392
- 250° F. _____ 1050
- 350° F. _____ 1049
- 500° F. _____ 1514

Honeycomb peel strength (in lbs./in.):
- −67° F. _____ 3
- RT _____ 30
- 180° F. _____ 9

Honeycomb peel strength (in. lbs./in.):
- RT _____ 27.5

The data of Table IV although again showing relatively high shear strength over the broad temperature range, show lower flexibility than that of Example 1, due to the lower elastomer content of the adhesive formulation.

EXAMPLE 3

In this example, another adhesive film was prepared and evaluated following the procedures of Example 1. The dicyanate used in this example was resorcinol dicyanate (Compound 2 in Table I) instead of the dicyanate of Bisphenol A. The formulations used in preparing this adhesive film are as follows:

|  | G. |
|---|---|
| Resorcinol dicyanate | 100 |
| Methyl ethyl ketone | 100 |
| Dicyanate solution | 200 |

|  | G. |
|---|---|
| Acrylonitrile-butadiene rubber | 100 |
| Sulfur | 3 |
| ZnO | 5 |
| Methyl ethyl ketone | 325 |
| Mill base solution | 433 |

|  | G. |
|---|---|
| Mill base solution | 173 |
| Dicyanate solution | 200 |
| Adhesive solution [1] | 373 |

[1] Containing 40 wt. percent elastomer.

The results of evaluating the test configurations are shown in Table V.

TABLE V

Overlap shear strength (p.s.i.):
- −67° F. _____ 3957
- RT _____ 4112
- 180° F. _____ 2567
- 250° F. _____ 2110
- 350° F. _____ 1755
- 500° F. _____ 720

T-peel strength (p.i.w.):
- −67° F. _____ 8
- RT _____ 85
- 180° F. _____ 36

The data of Table V show that high strength values are obtained similar to that obtained in Example 1 when Bisphenol A dicyanate is used as the dicyanate.

EXAMPLE 4

In this example, another adhesive film was prepared and evaluated following the procedures of Example 1. The acrylonitrile-butadiene rubber was cured instead with a commercial peroxide vulcanizing agent (viz., DiCup 40C, a 40% active dicumyl peroxide). The formulations used in preparing this adhesive film are as follows:

|  | G. |
|---|---|
| Acrylonitrile-butadiene rubber | 100 |
| Peroxide | 5 |
| Methyl ethyl ketone | 325 |
| Mill base solution | 430 |

|  | G. |
|---|---|
| Bisphenol A dicyanate | 100 |
| Methyl ethyl ketone | 100 |
| Dicyanate solution | 200 |

| | |
|---|---|
| Mill base solution | 172 |
| Dicyanate solution | 200 |
| Adhesive solution [1] | 372 |

[1] Containing 40 wt. percent elastomer.

The results of evaluating the test configurations are shown in Table VI.

TABLE VI

Overlap shear strength (p.s.i.):

| | |
|---|---|
| −67° F. | 3365 |
| RT | 4110 |
| 180° F. | 2527 |
| 250° F. | 2095 |
| 350° F. | 1831 |
| 500° F. | 1308 |

T-peel strength (p.i.w.):

| | |
|---|---|
| −67° F. | 2 |
| RT | 32.5 |
| 180° F. | 16 |

Honeycomb peel strength (in lbs./in.):

| | |
|---|---|
| RT | 18.8 |

The above data of Table VI show that high strengths similar to that of Example I can be obtained, using a different curing system for the elastomer.

EXAMPLE 5

In this example, for purposes of comparison with the foregoing examples, an adhesive film was prepared by blending a mill base solution of an epoxy novolak (DEN–438, cured with diamino diphenyl sulfone). The formulations used to prepare this comparison adhesive film are as follows:

| | G. |
|---|---|
| Acrylonitrile-butadiene rubber | 100 |
| Sulfur | 3 |
| ZnO | 5 |
| Mill base | 108 |

| | |
|---|---|
| Mill base | 30 |
| Epoxy novolak | 100 |
| Diamino diphenyl sulfone | 38 |
| Methyl ethyl ketone | 168 |
| Adhesion solution | 336 |

The results of evaluating the test configurations bonded with this comparison adhesive film are shown in Table VII.

TABLE VII

Overlap shear strength (p.s.i.):

| | |
|---|---|
| −67° F. | 3725 |
| RT | 2440 |
| 180° F. | 1323 |
| 250° F. | 1332 |
| 350° F. | 1182 |
| 500° F. | 695 |

T-peel strength (p.i.w.):

| | |
|---|---|
| −67° F. | 4 |
| RT | 8.5 |
| 180° F. | 9 |

The data of Table VII show that use of an epoxy novolak rather than dicyanate does not produce a bond having high strength at high temperatures, nor a bond which has as good a flexibility at room temperature.

Various modifications and alterations of this invention will become apparent to those skilled in the art without departing from the scope and spirit of this invention, and it should be understood that this invention is not to be unduly limited to the illustrative embodiment set forth herein.

I claim:

1. An adhesive composition comprising a dicyanate and a compatible, vulcanizable, film-forming synthetic elastomer comprising a copolymer of acrylonitrile and butadiene.

2. The composition of claim 1, wherein said dicyanate has the formula:

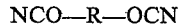

where R is a divalent radical comprising an aromatic nucleus or a plurality of aromatic nuclei, which nuclei can be linked together by bridging members of the group consisting of —O—, —S—, —C(O)—, —SO₂—, and lower alkylene.

3. The composition of claim 2, wherein said dicyanate is

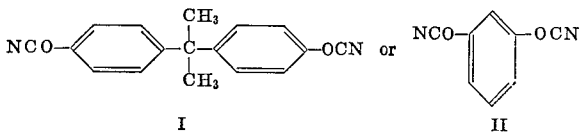

and said composition further comprises a curing system for said copolymer comprising sulfur and zinc oxide.

4. The composition of claim 3, wherein said dicyanate is I.

5. The composition of claim 3, wherein said copolymer contains 18 to 50 weight percent of bound acrylonitrile and has a Mooney viscosity of 45 to 95.

6. The composition of claim 3, wherein said copolymer contains 25 to 50 weight present of bound acrylonitrile and has a Mooney viscosity of 55 to 95.

7. The composition of claim 3, wherein said copolymer is 15 to 50 weight percent based on the weight of dicyanate.

8. The composition of claim 3, wherein said copolymer is 35 to 45 weight percent based on the weight of dicyanate.

9. An adhesive composition comprising Bisphenol A dicyanate, 35 to 45 weight percent of an acrylonitrile-butadiene copolymer (based on the weight of said dicyanate) having 25 to 50 weight per bound acrylonitrile and a Mooney viscosity of 55 to 95 and 1 to 10 parts each of sulfur and zinc oxide based on 100 parts by weight of said copolymer.

10. A film comprising the composition of claim 1.

11. A bonded structure comprising adherends bonded by the thermally cured composition of claim 1.

12. A method for making a film adhesive, which comprises admixing a dicyanate and a compatible vulcanizable film-forming synthetic elastomer in a solvent, casting the resulting solution in the form of a film, and drying said film to evaporate said solvent, said elastomer comprising a copolymer of acrylonitrile and butadiene.

13. A method for bonding adherends, which comprises interposing a film of the composition of claim 1 between said adherends, and heating said interposed film to cure the same and effect, a bond between adherends.

References Cited

FOREIGN PATENTS 1,055,524   1/1967   Great Britain _____ 260—887

MURRAY TILLMAN, Primary Examiner

J. SEIBERT, Assistant Examiner

U.S. Cl. X.R.

156—331; 260—32.8 A, 33.6 A, 33.8 UA, 77.5 NC

UNITED STATES PATENT OFFICE
CERTIFICATE OF CORRECTION

Patent No. 3,649,714          Dated March 14, 1972

Inventor(s) David A. Wangsness

It is certified that error appears in the above-identified patent and that said Letters Patent are hereby corrected as shown below:

Col. 8, line 1, delete "Honeycomb peel strength (in lbs./in.)"

and substitute therefor

-- T-peel strength (p.i.w.) --

Signed and sealed this 22nd day of August 1972.

(SEAL)
Attest:

EDWARD M. FLETCHER, JR.
Attesting Officer

ROBERT GOTTSCHALK
Commissioner of Patents